US007531197B2

(12) United States Patent  (10) Patent No.: US 7,531,197 B2
Jones  (45) Date of Patent: May 12, 2009

(54) TOY CANDY DISPENSING ASSEMBLY WITH TONGS

(75) Inventor: Lawrence T. Jones, Westlake Village, CA (US)

(73) Assignee: Kandy Kastle, Inc., San Diego, CA (US)

( * ) Notice: Subject to any disclaimer, the term of this patent is extended or adjusted under 35 U.S.C. 154(b) by 744 days.

(21) Appl. No.: 11/134,881

(22) Filed: May 23, 2005

(65) Prior Publication Data

US 2006/0263491 A1 Nov. 23, 2006

(51) Int. Cl.
A23G 3/50 (2006.01)
B25B 7/00 (2006.01)
B25B 9/00 (2006.01)
F41G 1/35 (2006.01)
A47G 21/10 (2006.01)

(52) U.S. Cl. .................. 426/104; 362/120; 362/119; 362/191; 362/253; 362/555; 362/113; 362/114; 294/3; 294/16; 294/99.2; 426/132; 446/386; 446/86; 446/73

(58) Field of Classification Search ................ 426/104, 426/132; 362/120, 109, 119; 294/3, 16, 294/99.2
See application file for complete search history.

(56) References Cited

U.S. PATENT DOCUMENTS

| 328,867 | A | * | 10/1885 | Van Leeuwen ............. 426/104 |
| 1,569,747 | A | * | 1/1926 | Haug ........................ 426/104 |
| 1,749,614 | A | * | 3/1930 | Sorensen .................... 294/115 |
| 2,666,843 | A | * | 1/1954 | Zuckerman ................ 362/120 |
| 4,914,748 | A |  | 4/1990 | Schlotter, IV et al. |
| 4,955,971 | A | * | 9/1990 | Goulter ......................... 294/7 |
| 5,063,177 | A | * | 11/1991 | Geller et al. ................ 438/107 |
| 5,471,373 | A |  | 11/1995 | Coleman et al. |
| 5,545,069 | A |  | 8/1996 | Glynn et al. |
| 5,733,033 | A |  | 3/1998 | Coleman et al. |
| 5,876,995 | A | * | 3/1999 | Bryan ........................ 435/189 |
| 5,921,654 | A | * | 7/1999 | Coyle ......................... 362/120 |
| 6,092,847 | A | * | 7/2000 | Kwan ........................... 294/16 |
| 6,221,598 | B1 | * | 4/2001 | Schumm et al. ................ 435/6 |
| 6,296,365 | B1 | * | 10/2001 | McCalla et al. ............. 362/119 |
| 6,398,387 | B1 |  | 6/2002 | Wienhold |
| 6,416,800 | B1 | * | 7/2002 | Weber et al. ................ 426/104 |
| 6,428,180 | B1 | * | 8/2002 | Karram et al. .............. 362/119 |
| 6,461,653 | B1 | * | 10/2002 | Cox ............................. 426/88 |
| 6,471,364 | B1 | * | 10/2002 | Plante ......................... 362/34 |
| 6,619,816 | B1 |  | 9/2003 | Johnson |
| 6,675,483 | B2 | * | 1/2004 | Bond et al. .................... 30/142 |
| 6,988,814 | B1 | * | 1/2006 | Correa ........................ 362/109 |
| 7,008,077 | B2 | * | 3/2006 | Raichlen ..................... 362/120 |

(Continued)

FOREIGN PATENT DOCUMENTS

| DE | WO 02/15709 | * | 2/2002 |
| GB | 191327410 | * | 10/1914 |
| GB | 288486 | * | 4/1928 |

Primary Examiner—Jennifer McNeil
Assistant Examiner—Vera Katz

(57) ABSTRACT

Illuminated tongs include a pair of arm members joined together at a hinged end for relative moment to grasp an object such as a translucent confectionary item. A battery compartment is connected to at least one of the arm members, and a spring is mounted in the battery compartment to bias the tongs to an open position. A light source is hidden within one of the arm members adjacent the grasping end. A switch member, associated with the battery compartment, is automatically closed when the grasping end is moved to grasp a confectionary member whereby light will glow from the interior of the confectionary member.

17 Claims, 2 Drawing Sheets

U.S. PATENT DOCUMENTS

| | | | |
|---|---|---|---|
| 7,055,200 B2 * | 6/2006 | Lion et al. | 7/113 |
| 7,232,235 B2 * | 6/2007 | Morrow | 362/120 |
| D563,746 S * | 3/2008 | Schmidt et al. | D8/57 |
| 2003/0000098 A1 * | 1/2003 | Mackin et al. | 33/558.01 |
| 2005/0063177 A1 * | 3/2005 | Correa | 362/109 |
| 2007/0291474 A1 * | 12/2007 | Hui | 362/109 |

* cited by examiner

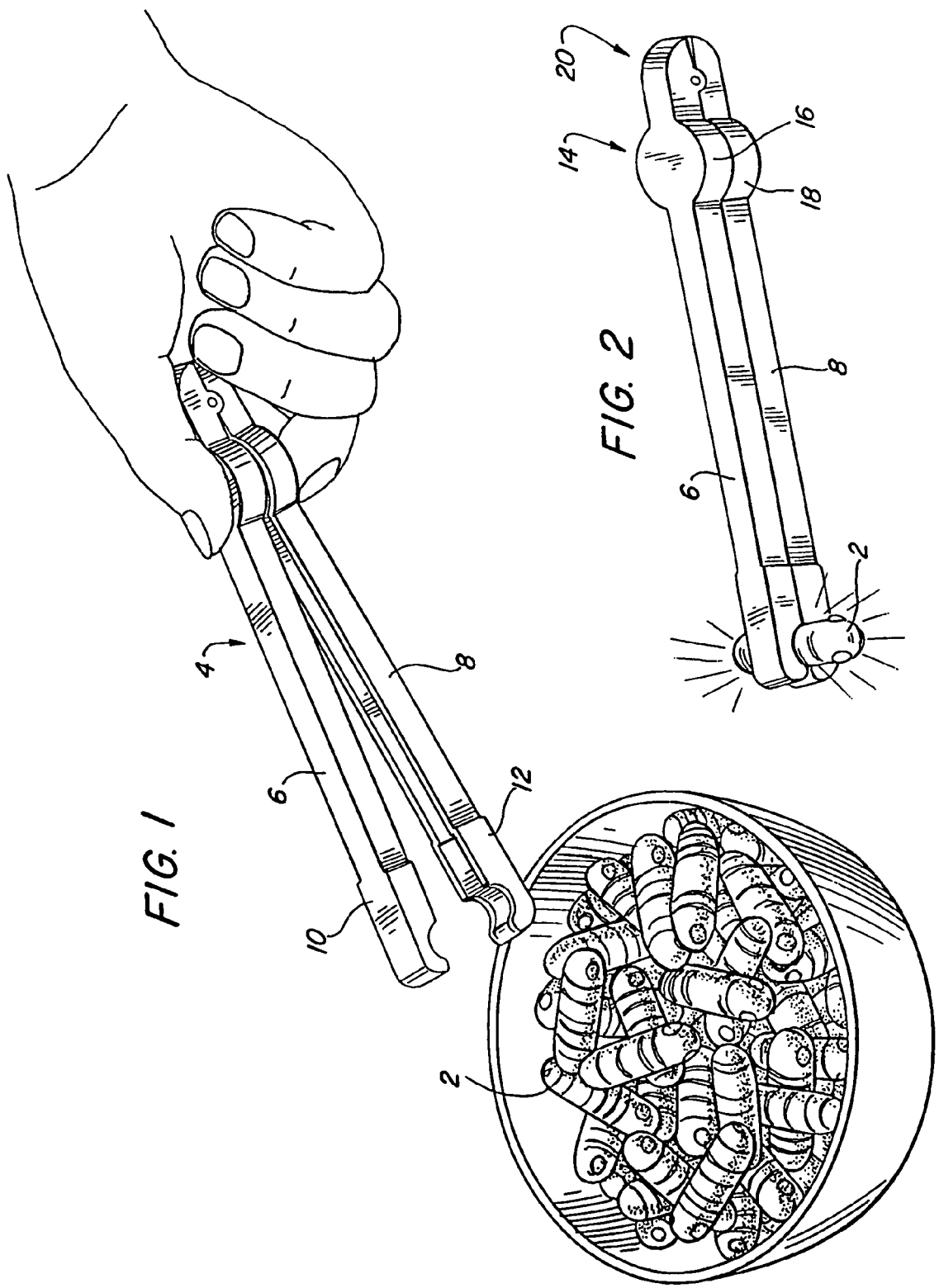

TOY CANDY DISPENSING ASSEMBLY WITH TONGS

BACKGROUND OF THE INVENTION

1. Field of the Invention

The present invention is directed to a novelty item for dispensing confectionary items, and more particularly to a grasping implement configured to grasp a confectionary item of a semi-transparent nature so that the confectionary item appears to glow when held by the grasping implement.

2. Description of Related Art

Novelty confectionary items such as a gummy candy and various molded candy configurations have been known and are commercially supplied to children of all ages. The ability to not only enjoy a confectionary item, but further to add a playful toy characteristic has also been attempted in the prior art.

While novelty and toy candy dispensing devices have been utilized for confectionary items, including hard and soft candy, there is a constant desire to provide new and entertaining devices to children.

SUMMARY OF THE INVENTION

The present invention provides a toy candy dispensing assembly with a grasping implement that is configured to illuminate and complement the size of the confectionary member. The confectionary member can be of an approximately semi-transparent or transparent nature so that light can be transmitted through the confectionary by the grasping implement used as tongs. Preferably the confectionary can be formed or molded into a simulated configuration that complements light transmission and/or emission. For example, a glow worm of a gummy configuration can be utilized with the present invention to receive light from an unexpected source and to glow.

The grasping implement such as the tongs can include a hidden light source for illuminating the confectionary member when it is captured by the grasping portion of the tongs wherein the confectionary member will appear to glow. Preferably the light source is hidden within, for example, one of the arms of the tongs so that there is a surprising effect when the tongs contact and secure the confectionary item. This can create the pleasant and unexpected appearance of the confectionary item glowing when grasped by the tongs. Thus a confectionary item in the configuration of a wormlike or other configured creature or object and made of a semi-transparent material will receive light from the tongs and disperse it so that the body of the confectionary member is glowing and appears to glow by itself.

The tongs can include a pair of arm members joined together at a hinged end for relative movement to enable a grasping of a confectionary item. A battery compartment can be formed in one or more of the arms for holding one or more batteries with an electrical connection going from a battery through a hidden switch member to a light source adjacent a grasping end of the arm members. A light-emitting diode (LED) of a small configuration can be the light source, although other sources can be used, and can be placed immediately adjacent a jaw portion of the tongs to illuminate an object when grasped within the jaws.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a toy candy dispensing assembly, including an illuminate grasping implement and appropriately molded confectionary members;

FIG. 2 is a perspective view showing the grasping implement closed about a confectionary member to have it glow;

DETAILED DESCRIPTION OF THE PREFERRED EMBODIMENTS

Figure 3:
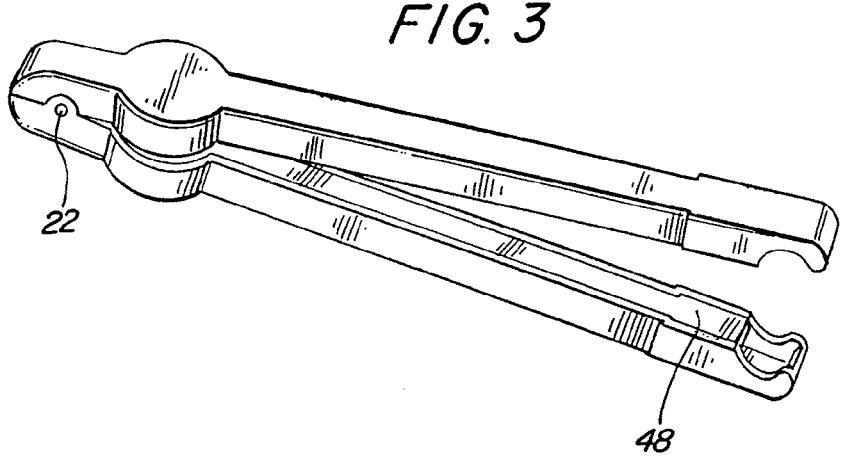
FIG. 3 is an upper perspective view of the grasping implement or tongs of the present invention.

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Referring to FIG. 1, a bowl of confectionary members 2 is disclosed. Preferably the confectionary members can be molded to provide a simulation of a creature or object that can be associated with an emission of light, for example, of a glow worm, as shown in FIGS. 1 and 2. The confectionary material should be transparent or semi-transparent so it can act as a light pipe upon the introduction of light. As can be appreciated, the confectionary member 2 can be formed from other ingredients as long as the final product is translucent so that it can be made to appear as glowing. The length and/or size of the confectionary product and strength of the light source will affect the glowing appearance. A preferred glowing worm or lightning bug is about one inch in length so that the entire product will appear to glow. The confectionary member 2 can be formed from a moldable, gummy candy material such as a solidified mixture of Sugar, Corn Syrup, Gelatin, Sorbitol, Citric Acid, Pectin, Malic Acid, Bees Wax, Artificial Flavors, Latic Acid and Artificial Colours.

A grasping implement such as tongs 4 are used to select an individual confectionary member 2 as shown in FIG. 2. The grasping implement 4 can be formed basically of inexpensive plastic material, although other types of materials can be utilized. The tongs 4 include a hollow first arm member 6 and a hollow second arm member 8, each having an approximately U shaped cross-sectional configuration with a jaw or grasping portion, respectively, at the end of each arm. Thus, first arm member 6 has a jaw configuration 10 with a semicircular traverse indent in each of the walls of the jaw 10. A similar jaw configuration 12 is provided at one end of the side second arm member 8.

At the other end of the respective arm members 6 and 8, a battery compartment 14 is formed of a first battery housing 16 on arm member 6 and a second battery housing 18 on arm member 8. The first battery housing 16 and the second battery housing 18 have a cylindrical circular opening configuration and can be integrally molded with their respective arm members. A hinged end portion 20 is positioned at a distal end from the jaws 10 and 12. A pivot point 22 includes a rod 24 inserted through bores in appropriate mounting portions 26 integrally provided on the first arm member 6 and mounting portions 28 integrally provided on the second arm member 8, see FIG. 4.

Inclined bearing surfaces 30 and 32 on the hinged end portion 20 extend from the mounting portions 26 and 28 respectively and define the extent or limit of the opening of the jaws 10 and 12 as shown in FIG. 3.

Figure 4:
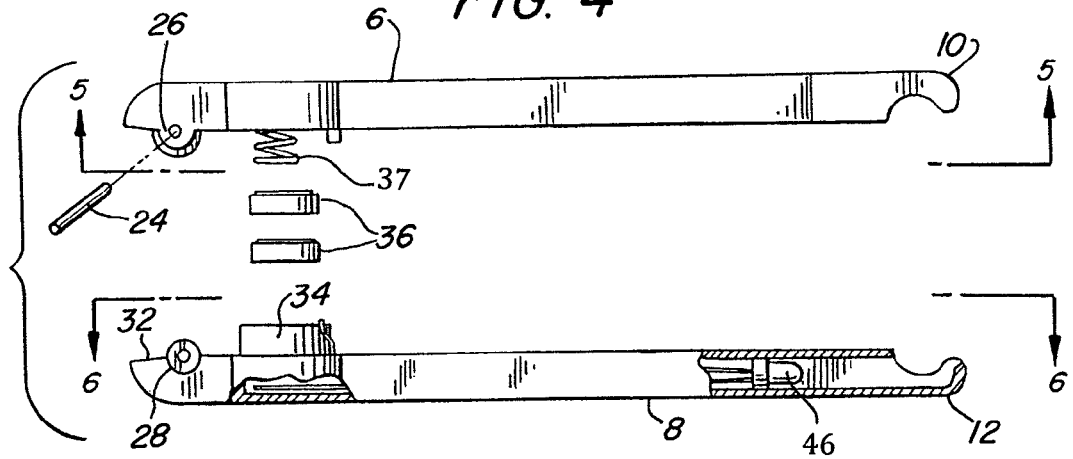
FIG. 4 is a partial exploded side view of the grasping implement.
Figure 5:
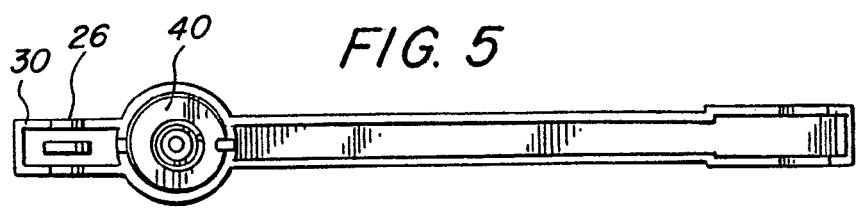
FIG. 5 is a planar view of one arm.
Figure 6:
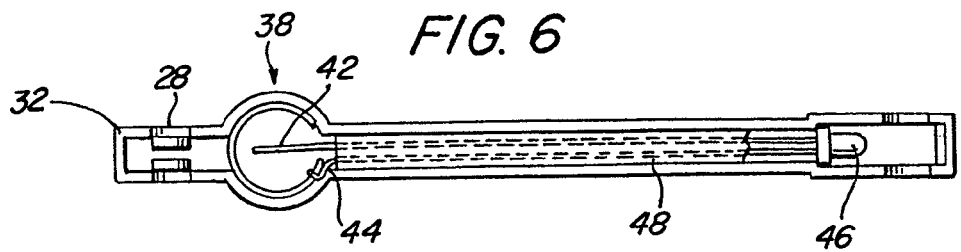
FIG. 6 is a planar view of the other arm.

Referring to FIG. 4, an exploded view of the tongs 4 is shown. The lower battery housing 18 includes a cylindrical wall 34 for receiving a pair of batteries 36. A hidden switch 38 is formed within and part of the battery housing by a conductive metal ring 40 and a pair of conductive wires 42 and 44 that are connected to a light source such as a LED 46 positioned adjacent the lower jaw 12. Other light sources can be used. A spring 37 biases the batteries 36 together while also positioning the tongs 4 in a biased open position as shown in FIG. 3. The closing of the tongs 4 also automatically closes the hidden switch 38 and lights the light source 46 to cause any grasped object to be lit up.

An elongated cover plate 48 is provided to conceal and protect the light source 46 on the second arm member 8 by extending across the U-shaped opening.

In operation, the user grasps a desired confectionary product 2 in the jaws 10 and 12 by closing the tongs 4 against the bias of spring 37. The light source 46 is activated within the lower or second arm member 8 and light enters into the confectionary product 2 to create an unexpected glowing effect. Preferably the confectionary product 2 is configured to enhance the glowing effect, for example, as a glow worm.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A toy candy dispensing assembly comprising:
   an approximately semi-transparent confectionary member; and
   a plastic illuminant grasping implement having a selectively closing grasping portion, of a size configured to secure the confectionary member, the grasping implement including a light source for illuminating the confectionary member when secured by the grasping portion wherein the confectionary member will glow, wherein the illuminant grasping implement includes a pair of arm members joined together at a hinged end for relative movement to enable a grasping of a confectionary member at the grasping portion, and the light source is hidden from view within one of the pair of arm members to suppply light to the grasping portion;
   a battery compartment positioned in at least one of the arm members, wherein the battery compartment includes a spring unit to bias the pair of arm members to an open position; and
   a hidden switch member, located internally within the grasping implement, for automatically enabling an ON electrical connection from the battery compartment to the light source only when the grasping portion is moved from the open position to grasp to confectionary member,
   whereby the user, in manually pushing the pair of arm members to close, will cause the confectionary member to glow only when the grasping portion is closing.

2. The toy candy dispensing assembly of claim 1 wherein the light source is a light emitting diode.

3. The toy candy dispensing assembly of claim 1 wherein the arm members are hollow.

4. The toy candy dispensing assembly of claim 3 wherein the respective arm members have an indented jaw and the light source illuminates only one of the indented jaws.

5. The toy candy dispensing assembly of claim 4 wherein the light source is positioned adjacent to one of the indented jaws within one of the hollow arm members to illuminate a contact area of the indented jaw with the confectionary member.

6. The toy candy dispensing assembly of claim 1 wherein the hinged end has inclined surfaces, distal from the grasping portion and a pivoting point, to define the extent of opening of the grasping portion.

7. The toy candy dispensing assembly comprising,
   at least one light transmissive candy member having an approximately cylindrical configuration portion;
   an illuminant tong member including
   a pair of hollow arm members joined together for relative movement to enable a grasping of the candy member at a hollow grasping end configured to encircle to candy member in a closed position;
   a battery compartment within at least one of the arm members;
   a spring member mounted in the battery compartment to bias the arm members to an open position at the grasping end;
   a light source within at least one of the arm members to only illuminate that arm member's hollow grasping end to enable the light to contact the candy member; and
   a switching member for automatically enabling an electrical connection from the battery compartment to the light source when the pair of hollow arm members are moved together whereby the grasping end is moved to grasp the candy member and the candy member will glow from the light in the hollow grasping end.

8. The toy candy dispensing assembly of claim 7 wherein the light source is positioned adjacent the grasping end and enclosed within one of the hollow arm members to internally illuminate a contact area of the grasping end with the candy member to cause it to glow.

9. The toy candy dispensing assembly of claim 8 wherein the arm members are joined together at a hinged end portion that has inclined surfaces, distal from the grasping end and a pivoting point, to define the extent of opening of the grasping end.

10. The toy candy dispensing assembly of claim 7 wherein the light source is a light emitting diode.

11. The toy candy dispensing assembly of claim 7 wherein the arm members are plastic.

12. The toy candy dispensing assembly of claim 7 wherein the respective arm members have a grasping end with an indented concave jaw.

13. A toy candy dispensing assembly comprising,
at least one light transmissive candy member;
an illuminating tong member including
a pair of arm members pivotally joined together adjacent a bearing end for relative movement to enable a grasping of the candy member at an opposite grasping end configured to grasp the candy member in a closed position, wherein the bearing end, for the pair of arm members, limits the pivotal movement to a predetermined maximum open position for the grasping end;
a battery compartment is formed between the pair of arm members adjacent the pivotal joining of the pair of arm members;
a spring member is mounted in the battery compartment to bias the pair of arm members to an open position at the grasping end while forcing the pair of arm members into contact at the bearing end to limit a maximum open position;
a light source is provided within at least one of the arm members to illuminate that arm member's grasping end., only when the pair of arm members are moved towards a closed position by user wherein the light source is hidden from a user's view, and
a switching member for enabling an electrical connection from the battery compartment to the light source to be activated only when the grasping end is moved to grasp the candy member, whereby the candy member will appear to glow with light from the hidden light source when grasped, wherein the switching member is hidden from a user's view.

14. The toy candy dispensing assembly of claim 13 wherein the switching member is within the pair of arm members and automatically activated to an ON condition when the user closes the grasping end and automatically activated to an OFF condition when the grasping member is opened to release the candy member.

15. The toy candy dispensing assembly of claim 14 wherein the pivotally joined position is located between the grasping end and the bearing end and adjacent the bearing end.

16. The toy candy dispensing assembly of claim 14 wherein the switch number is positioned within the battery compartment and the spring member is configured to contact a battery when the battery is mounted in the battery compartment.

17. The toy candy dispensing assembly of claim 13 wherein the battery compartment includes a first battery housing and a second battery housing integrally formed in the respective arm members and extending laterally outward from the respective arm members.

* * * * *